US006938175B2

(12) United States Patent
Lee

(10) Patent No.: US 6,938,175 B2
(45) Date of Patent: Aug. 30, 2005

(54) COMPUTER SYSTEM AND METHOD OF CONTROLLING STANDBY MODE THEREOF

(75) Inventor: Yong-Hoon Lee, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 678 days.

(21) Appl. No.: 09/860,607

(22) Filed: May 21, 2001

(65) Prior Publication Data

US 2002/0062455 A1 May 23, 2002

(30) Foreign Application Priority Data

Nov. 18, 2000 (KR) .......................... 2000/68762

(51) Int. Cl.⁷ ............................. G06F 1/26
(52) U.S. Cl. ................ 713/320; 713/2; 713/323; 714/14; 714/15
(58) Field of Search ............... 713/2, 300, 320, 713/323; 714/2, 14, 15

(56) References Cited

U.S. PATENT DOCUMENTS

| | | | |
|---|---|---|---|
| 5,551,008 A | 8/1996 | Saito | 711/161 |
| 5,557,777 A * | 9/1996 | Culbert | 713/2 |
| 5,603,038 A | 2/1997 | Crump et al. | |
| 5,721,930 A | 2/1998 | Kasuga | 713/323 |
| 5,832,281 A * | 11/1998 | Maeda | 713/300 |
| 5,845,134 A | 12/1998 | Arai | 713/322 |
| 5,944,828 A | 8/1999 | Matsuoka | |
| 6,052,793 A | 4/2000 | Mermelstein | 713/340 |
| 6,324,651 B2 * | 11/2001 | Kubik et al. | 713/323 |
| 6,523,125 B1 * | 2/2003 | Kohno et al. | 713/320 |
| 6,567,931 B1 * | 5/2003 | Jue | 714/23 |

FOREIGN PATENT DOCUMENTS

| | | |
|---|---|---|
| JP | 01-147649 | 6/1989 |
| JP | 05-204780 | 8/1993 |
| JP | 10-39962 | 2/1998 |
| JP | 11-194846 | 7/1999 |

OTHER PUBLICATIONS

Japanese Office Action; in corresponding Japanese Patent Application assigned Serial No. 2001–206985; mailed on Oct. 5, 2004.
Taiwanese Office Action; in corresponding Taiwanese Patent Application assigned Serial No. 090108859, dated Nov. 21, 2002.

* cited by examiner

Primary Examiner—Thuan Du
(74) Attorney, Agent, or Firm—Robert E. Bushnell, Esq.

(57) ABSTRACT

A computer system has a normal mode for performing its work in a normal and regular manner and a standby mode which progresses to a power saving mode after storing information about the state of the work in process in a memory. The computer system comprises: a power management controller generating a control signal with respect to the normal mode and the standby mode, and storing the power mode information about the respective modes; a power supply part supplying normal power in the normal mode and standby power in the standby mode depending upon the control signal of the power management controller; a standby mode storing portion storing information identifying the standby mode when the mode of the system is shifted to the standby mode; and a controller determining whether the standby mode identification information exists in the standby mode storing portion when the power mode information of the power management controller indicates the standby mode during the re-booting operation, and performing normal booting when no standby mode identification information exists in the standby mode storing portion. With this configuration, when power is cut-off from and then re-supplied to a computer system, a stable booting operation can be performed.

25 Claims, 3 Drawing Sheets

COMPUTER SYSTEM AND METHOD OF CONTROLLING STANDBY MODE THEREOF

CLAIM OF PRIORITY

This application makes reference to, incorporates the same herein, and claims all benefits accruing under 35 U.S.C. § 119 from my application COMPUTER SYSTEM AND CONTROL METHOD OF WAITING MODE FOR COMPUTER SYSTEM filed with the Korean Industrial Property Office on 18 Nov. 2000 and there duly assigned Serial No. 68762/2000.

BACKGROUND OF THE INVENTION

1. Technical Field

The present invention relates to a computer system, and more particularly, to a computer system which is capable of performing a stable booting operation when power is cut-off and then re-supplied to the computer system, and a method of controlling a standby mode thereof.

2. Related Art

As computer systems have increasingly been used, power consumption has increased accordingly. In this regard, a power management function has been employed in the computer system in order to minimize power consumption. For reduction of power consumption of the computer system and efficient power management, a display operation of a displaying apparatus is in suspension (idle) if no data is input from an input unit for a certain period of time, or a drive operation of a hard disc drive is in suspension (idle) if the hard disc drive makes no access to the computer system for a certain period of time.

A power management function called advanced configuration and power interface (ACPI) specification for managing power of a computer system has been recently proposed, in which the state of the whole computer system is classified into six states.

According to the ACPI, a power management state in a computer system is roughly classified into six steps of sleeping states S0 through S5. The state S0 denotes a normal state (full power on), the states S1 through S4 denote standby states where power consumption of the computer system is stepwise reduced, and the state S5 denotes a soft-off state in which power of the whole system is cut off (full power off). A power supply device for the computer system having the above-described power management function supports an ATX specification including a power supply mechanism comprised of a main power and a standby power. The power supply device supporting the ATX specification always outputs the standby power under the condition that external power is supplied to the computer system. The standby power is supplied to a power management controller of the computer system.

Here, the S3 state of the ACPI is employed to re-use the computer system promptly. In the S3 state, power is not supplied to computer hardware devices except for a system memory and a power management controller composed of volatile memories. The process in which the system proceeds to the S3 state is called a 'suspend-to-ram' process during which data in process is stored in the system memory, and the S3 state of the ACPI is stored in the power management controller.

Since a general booting operation is not implemented when the computer system is switched from the S3 state to the normal state, it is possible to re-use the system promptly. However, if power supply to the system memory is cut-off in the ACPI S3 state due to power failure, standby power for maintaining data within the system memory is not supplied to the system memory, thereby causing the data in the volatile system memory to be lost.

If power is re-applied to drive the system again in that state, the basic input output system (BIOS) checks the state S3 in the ACPI of the power management controller, and sends to the system memory a signal requesting data that was being processed. The BIOS is a program for managing data flow between peripheral devices (such as a hard disc, a keyboard, and a mouse) and a computer operating system.

Although the data stored in the system memory is lost due to the cut-off of the power supply, the BIOS continuously requests the data in process from the memory. As a result, the computer system enters a 'Halt' state and the ACPI S3 state information in the power management controller is maintained by a complementary metal oxide semiconductor (CMOS) battery, even though the computer system is powered off and on, so that the computer system is unable to operate.

Thus, in order to escape from the 'Halt' state, after the computer system is turned off and its body is dismantled, the CMOS battery installed in the main board of the body should be removed to reset the power management controller. This procedure is extremely inconvenient, and it makes it inconvenient to use the computer system.

I have found that the 'Halt' state can be extremely inconvenient. Efforts have been made to improve control of systems.

Exemplars of recent efforts in the art include: U.S. Pat. No. 5,845,134 to Arai, entitled SUSPEND/RESUME CONTROL METHOD AND SYSTEM, issued on Dec. 1, 1998, U.S. Pat. No. 6,052,793 to Mermelstein, entitled WAKEUP EVENT RESTORATION AFTER POWER LOSS, issued on Apr. 18, 2000, U.S. Pat. No. 5,721,930 to Kasuga, entitled ELECTRONIC APPARATUS WITH COMPONENT OPERATING STATE CONTROL, issued on Feb. 24, 1998, U.S. Pat. No. 5,551,008 to Saito, entitled METHOD AND SYSTEM FOR RESUMING DATA PROCESSING IN COMPUTER, issued on Aug. 27, 1996, Japanese Patent No. 10-39962 to Clarke et al., entitled COMPUTER SYSTEM, published on Feb. 13, 1998, and Japanese Patent No. 11-194846 to Tsukada et al., entitled COMPUTER SYSTEM AND ITS SYSTEM STATE CONTROL METHOD, issued on Jul. 21, 1999.

While these recent efforts provide advantages, I note that they fail to adequately provide an apparatus or method for efficiently and conveniently preventing the aforementioned "Halt" state.

SUMMARY OF THE INVENTION

Accordingly, the present invention has been developed while keeping in mind the above-described problems, and an object of the present invention is to provide a computer system capable of performing a stable booting operation when power is cut-off due to power failure and then re-supplied to the computer system, and a method of controlling a standby mode thereof.

This and other objects of the present invention may be accomplished by the provision of a computer system having a normal mode for performing its work in a normal and regular manners and a standby mode which proceeds or progresses to a power saving mode after storing information about the state of the work in process in a memory, the computer system comprising: a power management controller for generating a control signal with respect to the normal mode and the standby mode, and for storing the power mode information about the respective modes; a power supply part for supplying normal power in the normal mode and standby power in the standby mode, depending upon the control signal of the power management controller; a standby mode storing portion for storing information identifying the standby mode when the mode of the system is shifted to the standby mode; and a controller for determining whether the standby mode identification information exists in the standby mode storing portion in case that when the power mode information of the power management controller indicates the standby mode during the re-booting operation, and for performing normal booting in case that when no standby mode identification information exists in the standby mode storing portion.

Preferably, the computer system further comprises a display part for displaying a warning when there is no standby mode identification information. It is also preferable that the standby mode storing portion comprise a volatile memory.

According to another aspect of the present invention, this and other objects may also be accomplished by a standby mode control method in a computer system having a standby mode which proceeds or progresses to a power saving mode in which information concerning a work state is stored in a memory, the standby mode control method comprising the steps of: detecting whether there exists a switching signal from a normal mode to the standby mode; storing power mode information on the standby mode in a standby mode storing portion when the switching signal exists and there is standby mode identification information in the standby mode storing portion, and then proceeding to the standby mode; determining whether a standby mode booting operation is performed when power is re-supplied; detecting the standby mode identification information from the standby mode storing portion when it is determined to be in the standby mode booting operation; and changing the power mode information of the standby mode stored in the power management controller to the normal mode information when there is no standby mode identification information as a result of the detection, and then performing a normal booting operation.

Preferably, the method further comprises the step of displaying a warning message when there is no standby mode identification information. It is preferable that the normal booting operation be performed when the standby mode booting operation is not performed when power is re-supplied.

To achieve these and other objects in accordance with the principles of the present invention, as embodied and broadly described, the present invention provides a computer apparatus, comprising: a power control unit for generating a control signal corresponding to a power mode selected from among a normal power mode and a standby power mode, said power control unit storing power mode information corresponding to said selected power mode, said normal power mode corresponding to a full-on power mode selected for normal operation of said computer apparatus, said standby power mode corresponding to a power saving mode selected for saving power and retaining data, the retained data corresponding to data that was being processed by said computer apparatus when said power saving mode was selected; a power supply unit for supplying normal power when said normal power mode is selected, and for supplying standby power when said standby power mode is selected, in dependence upon said control signal of said control unit; a first memory for storing standby information corresponding to said standby power mode when said standby power mode is selected; and a controller for determining whether said standby information is stored in said first memory when said control unit indicates that said standby power mode was selected, said controller performing said determining during a re-booting operation of said computer apparatus, said controller performing a normal booting when said standby information is not stored in said first memory.

To achieve these and other objects in accordance with the principles of the present invention, as embodied and broadly described, the present invention provides a method, comprising: sensing a first switching signal corresponding to switching an apparatus from a normal power mode to a standby power mode, said normal power mode corresponding to full power being used during normal operations of said apparatus, said standby power mode corresponding to standby power being used to retain data being processed; when said first switching signal is sensed, storing standby information corresponding to said standby power mode in a first memory, and retaining the data being processed by said apparatus; when the full power is re-supplied to said apparatus, selecting one booting operation from among a standby mode booting operation and a normal booting operation; when said standby mode booting operation is selected, detecting whether said standby information is stored in said first memory; when said standby mode booting operation is selected and said standby information is detected in said first memory, performing said standby mode booting operation and reading the retained data; and when said standby mode booting operation is selected and said standby information is not detected in said first memory, performing said normal booting operation.

To achieve these and other objects in accordance with the principles of the present invention, as embodied and broadly described, the present invention provides an apparatus, comprising: a power control unit for generating a control signal corresponding to a power mode selected from among a normal power mode and a standby power mode, said power control unit storing power mode information corresponding to said selected power mode, said normal power mode corresponding to a full-on power mode selected for normal operation of said apparatus, said standby power mode corresponding to a power saving mode selected for saving power and retaining data, the retained data corresponding to data that was being processed by said apparatus when said power saving mode was selected; a power supply unit for supplying normal power when said normal power mode is selected and for supplying standby power when said standby power mode is selected, in dependence upon said control signal of said control unit; a first memory for continuously retaining standby information corresponding to said standby power mode when said standby power mode is selected and while said apparatus continuously receives at least said standby power; a second memory for continuously retaining the data when said power saving mode is selected and while said apparatus continuously receives at least said standby power, the data not being retained by said second memory when said computer apparatus does not receive at least said standby power; and a controller for determining whether said standby information is retained in said first memory when said control unit indicates that said standby power mode was selected, said controller performing said determining during a re-booting operation of said apparatus, said controller performing a normal booting when said standby information is not in said first memory.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE INVENTION

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions or constructions are not described in detail since they would obscure the invention in unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
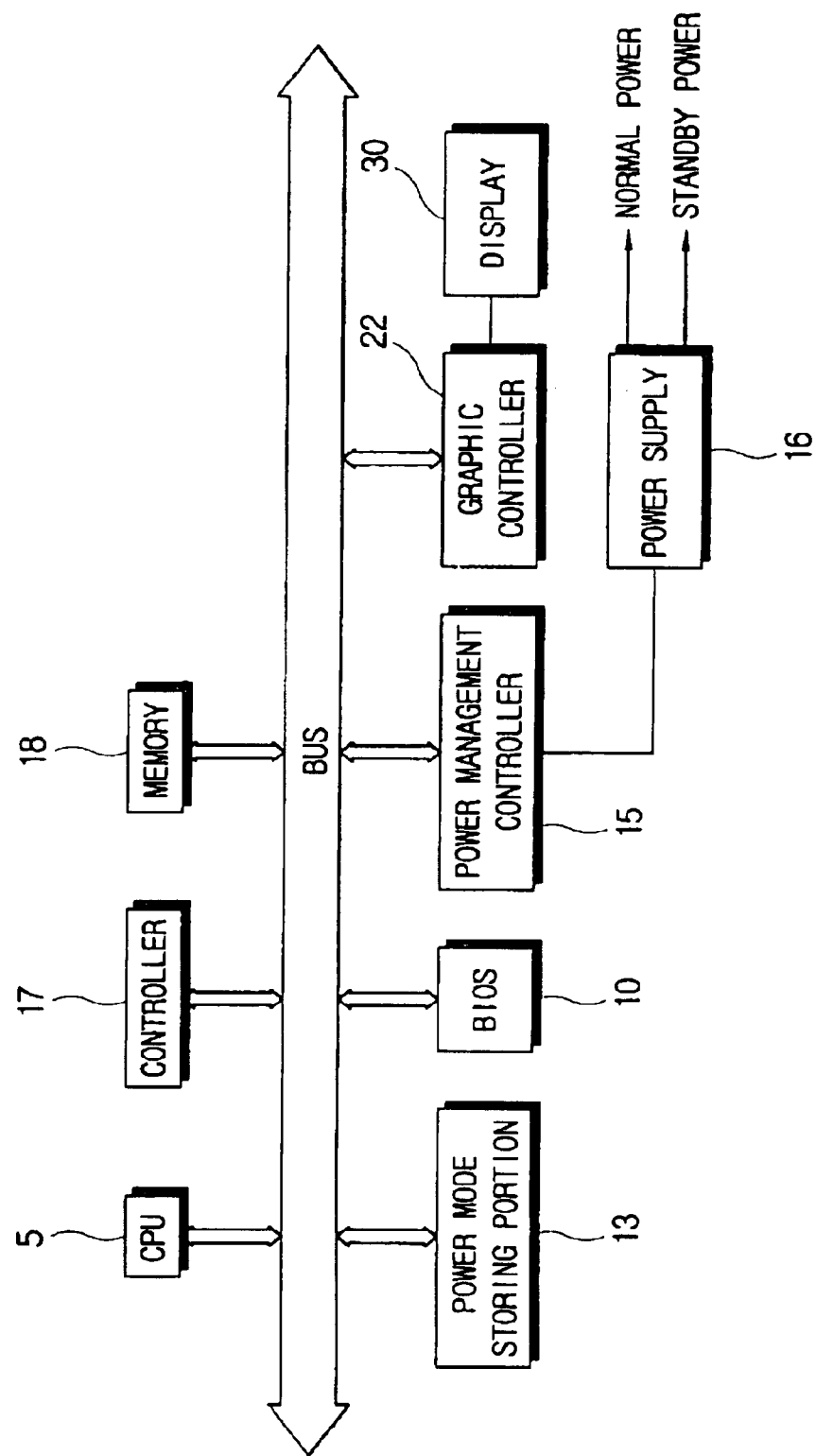
FIG. 1 is a block diagram of an apparatus used to explain a method of ing a standby mode of a computer system in accordance with the principles of the invention.

A preferred embodiment of the present invention will be described with reference to the accompanying drawings. As shown in FIG. 1 which is a block diagram used to explain a method of controlling a standby mode of a computer system according to the present invention, the computer system includes a power supply 16 for supplying a normal voltage of 3.3 volts (V) and a standby voltage of 5 volts, a memory 18 for temporarily storing data therein, and a power management controller 15 for controlling the power supply 16 and storing power mode information therein. The memory 18 is also known as second memory 18.

The computer system includes a basic input output system read only memory (BIOS ROM) 10 storing therein a program for identifying through a central processing unit (CPU) 5 whether various devices in a main body of the computer system are in place and are ready to operate, and then reading out an operating system from a hard disc so as to load it in the memory 18 when the computer system is booted, a flag memory or power mode storing portion 13 storing therein an S3 identification flag indicating the state of ACPI S3 mode (standby mode) at the time when the computer system is switched to the standby mode, and a controller 17 for controlling a booting operation in standby mode. The flag memory 13 is a volatile memory in which data is deleted if power is cut-off. The flag memory 13 may also be referred to as power mode storing portion 13 or as first memory 13. The BIOS ROM 10 is also known as BIOS 10.

A power management controller 15 stores the S3 identification flag in the flag memory 13 when a mode of the computer system is switched from the normal mode to the standby mode. The computer system according to the present invention checks the power mode information of the power management controller 15 when power is cut off and then re-supplied to the computer system. When the computer system is in the S3 state, that is, in the standby mode, the computer system re-checks the flag memory 13 to detect whether or not the S3 identification flag exists therein. Depending upon the detection result of the S3 identification flag in the flag memory 13, the computer system displays a warning message in the display part 30, or reads out data from the memory 18 during its operation to display that data in the display part 30.

Specifically, if the S3 identification flag is present in the flag memory 13 when power is re-supplied to the system after the power supply was interrupted, the computer system implements the standby mode booting operation. On the other hand, if the S3 identification flag is not present in the flag memory 13, this means that the S3 identification flag is erased due to certain problems, for example, power saving in the ACPI S3 mode. Thus, in this case, the computer system switches the power mode information of the power management controller 15 from the ACPI S3 mode to the ACPI S0 mode and implements the normal booting operation.

Figure 2:
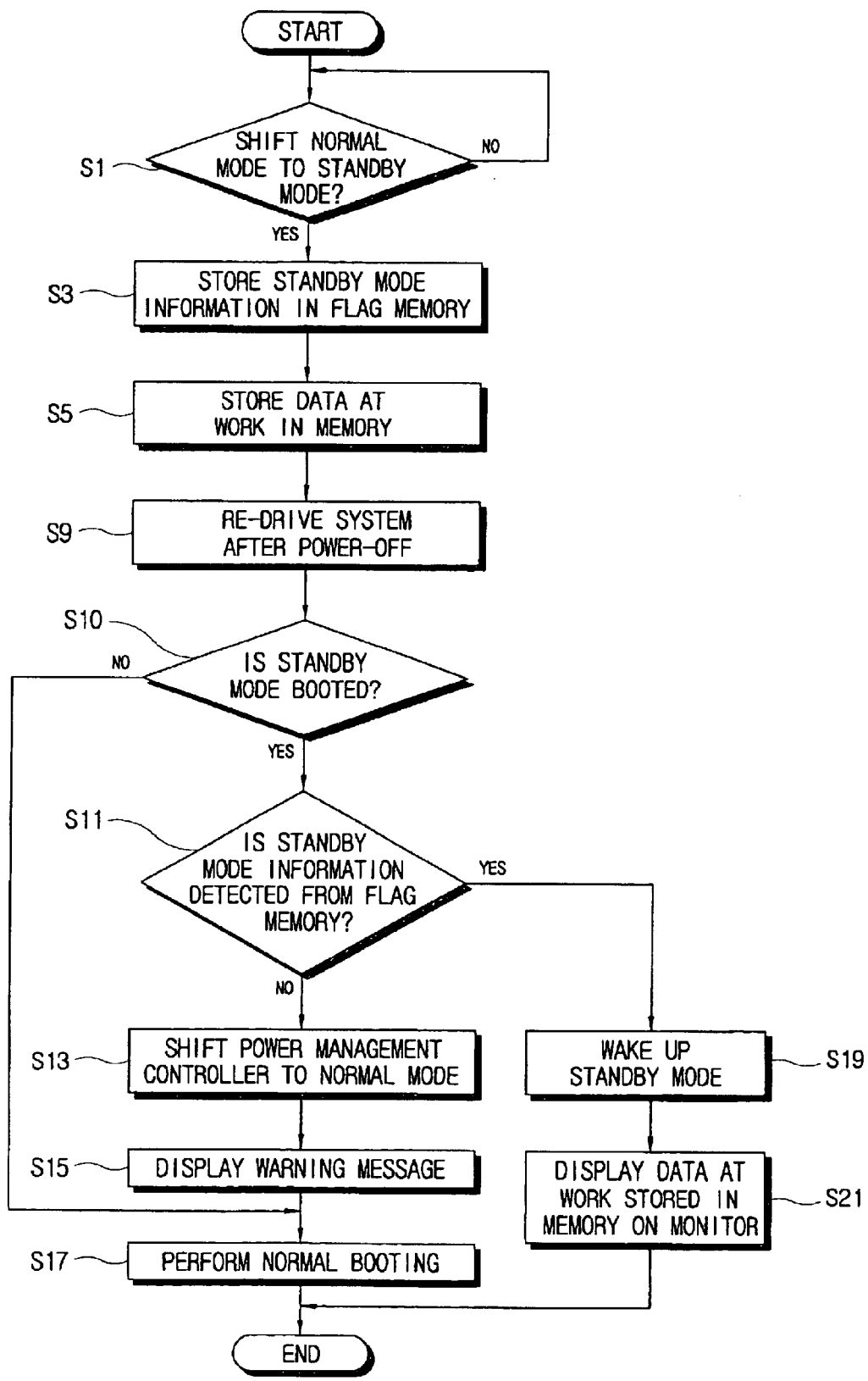
FIG. 2 is a flow-chart view illustrating a method of controlling standby mode in accordance with the principles of the present invention.
Figure 3:
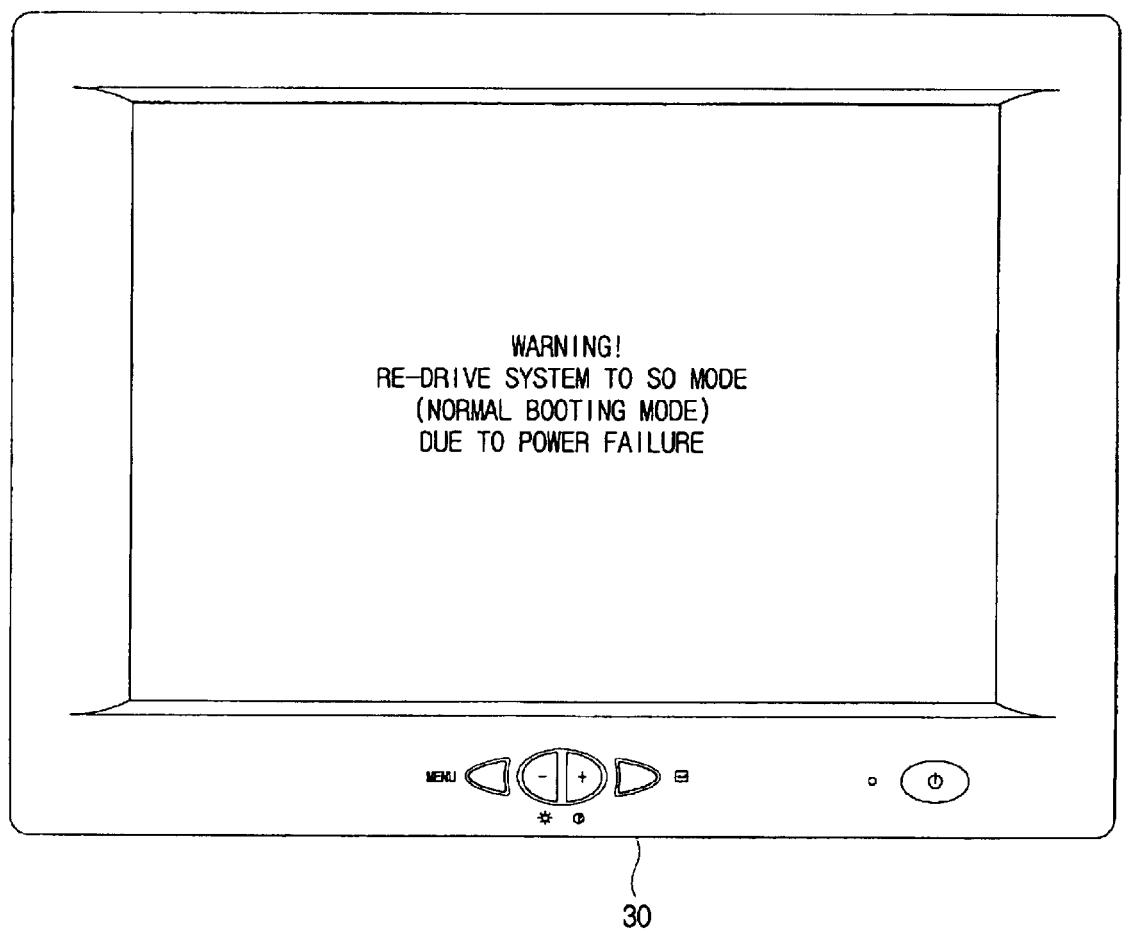
FIG. 3 shows a warning screen displayed on a monitor during a normal booting in the method of FIG. 2 in accordance with the principles of the present invention.

FIG. 2 is a flow-chart view illustrating a method of controlling the standby mode according to the present invention, and FIG. 3 shows a warning screen displayed on the monitor 30 during a normal booting in the method of FIG. 2.

In FIG. 2, at step S1, if the power mode of the system is switched from the normal mode to the ACPI S3 (standby mode), then the BIOS 10 switches the power mode information of the power management controller 15 to ACPI S3 mode. At step S3, the power management controller 15 stores the S3 identification flag in the flag memory 13. At step S5, the operating system stores data in process in the memory 18, and sends the switched standby mode signal (ACPI S3 mode signal) to the BIOS 10.

If power is cut-off, the standby voltage of 5V is not supplied to the volatile flag memory 13. Accordingly, the S3 identification flag stored in the flag memory 13 is lost. At step S9, power is re-supplied to the computer system to re-drive the system. At step S10, the BIOS 10 is driven in order to detect power mode information within the power management controller 15, to thereby determine whether the detected power mode is the standby mode. At step S11, if the power mode information of the power management controller 15 is the ACPI S3 mode, the flag memory 13 is checked so as to detect the S3 identification flag.

Here, if the S3 identification flag exists in the flag memory 13, the BIOS does not implement the power on self test (POST) routine, and stores the operating system of the computer system in the memory. Then, at step S19, the operating system wakes up the standby mode. At step S21, the operating system reads out from the memory 18 data in process immediately before the system was terminated and displays that data in the monitor 30.

At step S13, if the S3 identification flag does not exist in the flag memory 13, the BIOS 10 changes the power mode information from the S3 state to the S0 state. At step S15, a warning message is displayed in the monitor 30 as shown in FIG. 3. At step S17, the BIOS 10 proceeds with the power on self test (POST) routine, to perform a normal booting process.

With this configuration, the computer system is provided with the flag memory 13 indicating the state of ACPI S3 mode according to the present invention. When power is cut-off, for example, due to power failure, and then re-supplied to drive the computer system in the ACPI S3 mode, the computer system checks the flag memory 13 and then deletes the power mode information of the power management controller 15, to thereby prevent the system from being in the 'Halt' state, and accordingly, to enable the computer system to be booted in a safe and stable manner.

The above embodiment of the present invention, has been described as applied to a desktop computer. However, the present invention can be used for a desktop computer, a personal computer, or a portable computer. A portable computer can be a notebook computer, laptop computer, palm-sized computer, hand-held computer, wearable computer, or other type of computer. The wearable computer can be a computer that can be worn on a user's body or attached to a user's clothing. The display unit 30 can be a cathode ray tube, a liquid crystal display, a gas-plasma display, a light emitting diode display, an electro-luminescent display, a field emission display, or any other type of display unit for displaying varying visual information to a user.

As described above, the present invention provides a computer system capable of performing a stable booting operation even when power is interrupted due to power failure and then re-supplied to the computer system.

While the present invention has been illustrated by the description of embodiments thereof, and while the embodiments have been described in considerable detail, it is not the intention of the inventor to restrict or in any way limit the scope of the appended claims to such detail. Additional advantages and modifications will readily appear to those skilled in the art. Therefor, the invention in its broader aspects is not limited to the specific details, representative apparatus and method, and illustrative examples shown and described. Accordingly, departures may be made from such details without departing from the spirit or scope of the inventor's general inventive concept.

What is claimed is:

1. A computer apparatus, comprising:
    a power control unit for generating a control signal corresponding to a power mode selected from among a normal power mode and a standby power mode, said power control unit storing power mode information corresponding to said selected power mode, said normal power mode corresponding to a full-on power mode selected for normal operation of said computer apparatus, said standby power mode corresponding to a power saving mode selected for saving power and retaining data, the retained data corresponding to data that was being processed by said computer apparatus when said power saving mode was selected;
    a power supply unit for supplying normal power when said normal power mode is selected, and for supplying standby power when said standby power mode is selected, in dependence upon said control signal of said power control unit;
    a first memory comprising a volatile memory for storing standby information corresponding to said standby power mode when said standby power mode is selected; and
    a controller for determining whether said standby information is stored in said first memory when said control unit indicates that said standby power mode was selected, said controller performing said determining during a re-booting operation of said computer apparatus, said controller performing a normal booting when said standby information is not stored in said first memory.

2. The apparatus of claim 1, further comprising a display part for displaying a warning message when said standby information is not stored in said first memory.

3. The apparatus of claim 2, said first memory storing said standby information only when said computer apparatus continuously receives said standby power.

4. The apparatus of claim 3, further comprising a second memory for retaining the data when said power saving mode is selected, the data being retained by said second memory only when said computer apparatus continuously receives said standby power, the data not being retained by said second memory when said computer apparatus does not receive said standby power.

5. The apparatus of claim 4, said computer apparatus comprising one selected from among a desktop computer, a notebook computer, a laptop computer, a palm-sized computer, a hand-held computer, and a wearable computer.

6. The apparatus of claim 1, said first memory comprising a volatile memory.

7. The apparatus of claim 1, said first memory storing said standby information only when said computer apparatus continuously receives said standby power.

8. The apparatus of claim 1, said first memory failing to retain said standby information when said computer apparatus does not receive said standby power.

9. The apparatus of claim 1, further comprising a second memory for retaining the data when said power saving mode is selected, the data being retained by said second memory only when said computer apparatus continuously receives said standby power, the data not being retained by said second memory when said computer apparatus does not receive said standby power.

10. The apparatus of claim 1, further comprising a display part for displaying a warning message when said control unit indicates that said standby power mode was selected and said standby information is not stored in said first memory.

11. The apparatus of claim 10, said display part comprising one selected from among a cathode ray tube, a liquid crystal display, a gas-plasma display, a light emitting diode display, an electro-luminescent display, and a field emission display.

12. The apparatus of claim 1, said computer apparatus comprising one selected from among a desktop computer, a notebook computer, a laptop computer, a palm-sized computer, a hand-held computer, and a wearable computer.

13. A method, comprising:
    sensing a first switching signal corresponding to switching an apparatus from a normal power mode to a standby power mode, said normal power mode corresponding to full power being used during normal operation of said apparatus, said standby power mode corresponding to standby power being used to retain data being processed by said apparatus;
    when said first switching signal is sensed, storing standby information corresponding to said standby power mode in a first memory, and retaining the data being processed by said apparatus;
    when the full power is re-supplied to said apparatus, selecting one booting operation from among a standby mode booting operation and a normal booting operation;

when said standby mode booting operation is selected, detecting whether said standby information is stored in said first memory;

when said standby mode booting operation is selected and said standby information is detected in said first memory, performing said standby mode booting operation and reading the retained data; and when said standby mode booting operation is selected and said standby information is not detected in said first memory, performing said normal booting operation;

said selecting of said one booting operation being performed in dependence upon an output signal from a power management controller, said output signal corresponding to said standby mode booting operation when said sensing results in a sensing of said first switching signal.

14. The method of claim 13, further comprising displaying a warning message when said standby mode booting operation is selected and said standby information is not detected in said first memory.

15. The method of claim 14, further comprising retaining in a second memory the data being processed by said apparatus when said first switching signal is sensed.

16. The method of claim 13, further comprising deleting said standby information from said first memory when said apparatus stops receiving power.

17. The method of claim 13, further comprising retaining in a second memory the data being processed by said apparatus when said first switching signal is detected.

18. The method of claim 13, said normal power mode of said apparatus corresponding to a normal power mode of a computer selected from among a desktop computer, a notebook computer, a laptop computer, a palm-sized computer, a hand-held computer, and a wearable computer.

19. The method of claim 13, said storing of said standby information in said first memory comprising storing said standby information in a volatile memory.

20. The method of claim 13, said storing of said standby information being performed only when said apparatus is receiving at least said standby power.

21. The method of claim 20, further comprising deleting said standby information from said first memory when said apparatus stops receiving power.

22. An apparatus, comprising:

a power control unit for generating a control signal corresponding to a power mode selected from among a normal power mode and a standby power mode, said power control unit storing power mode information corresponding to said selected power mode, said normal power mode corresponding to a full-on power mode selected for normal operation of said apparatus, said standby power mode corresponding to a power saving mode selected for saving power and retaining data, the retained data corresponding to data that was being processed by said apparatus when said power saving mode was selected;

a power supply unit for supplying normal power when said normal power mode is selected, and for supplying standby power when said standby power mode is selected, in dependence upon said control signal of said power control unit;

a first memory for continuously retaining standby information corresponding to said standby power mode when said standby power mode is selected and while said apparatus continuously receives at least said standby power;

a second memory for continuously retaining the data when said power saving mode is selected and while said apparatus continuously receives at least said standby power, the data not being retained by said second memory when said computer apparatus does not receive at least said standby power; and a controller for determining whether said standby information is retained in said first memory when said control unit indicates that said standby power mode was selected, said controller performing said determining during a re-booting operation of said apparatus, said controller performing a normal booting when said standby information is not retained in said first memory.

23. The apparatus of claim 22, further comprising a display part for displaying a warning message when said control unit indicates that said standby power mode was selected and said standby information is not retained in said first memory.

24. The apparatus of claim 23, said apparatus comprising a computer selected from among a desktop computer, a notebook computer, a laptop computer, a palm-sized computer, a hand-held computer, and a wearable computer.

25. The apparatus of claim 24 said display part comprising one selected from among a cathode ray tube, a liquid crystal display, a gas-plasma display, a light emitting diode display, an electro-luminescent display, and a field emission display.

* * * * *